United States Patent
Rangel-Martinez et al.

(10) Patent No.: US 11,829,478 B2
(45) Date of Patent: Nov. 28, 2023

(54) FULL SERVER RECOVERY ARCHITECTURE FOR CLOUD BARE METAL INSTANCES

(71) Applicant: ORACLE INTERNATIONAL CORPORATION, Redwood Shores, CA (US)

(72) Inventors: Jaime Ismael Rangel-Martinez, Seattle, WA (US); Paul McMillan, Berkeley, CA (US); Matthew L King, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 722 days.

(21) Appl. No.: 16/418,077

(22) Filed: May 21, 2019

(65) Prior Publication Data

US 2020/0218811 A1 Jul. 9, 2020

Related U.S. Application Data

(60) Provisional application No. 62/789,692, filed on Jan. 8, 2019.

(51) Int. Cl.
*G06F 21/57* (2013.01)
*G06F 13/40* (2006.01)
(Continued)

(52) U.S. Cl.
CPC .............. *G06F 21/572* (2013.01); *G06F 8/65* (2013.01); *G06F 13/4022* (2013.01);
(Continued)

(58) Field of Classification Search
CPC .............. G06F 9/4401; G06F 9/45541; G06F 11/1464; G06F 11/145; G06F 11/3006;
(Continued)

(56) References Cited

U.S. PATENT DOCUMENTS

| 7,624,283 B2 | 11/2009 | Bade et al. |
| 8,261,126 B2 | 9/2012 | Sosnosky et al. |

(Continued)

OTHER PUBLICATIONS

FalconStor Software; FalconStor(R) RecoverTrac (TM): Automated Service oriented Disaster Recovery, 2013; 19 pgs, downloaded on May 21, 2019 from: https://www.falconstor.com/assets/documents/RecoverTrac_Automated_Service-oriented_DR_White_Paper_140725.pdf.

(Continued)

*Primary Examiner* — Tae K Kim
(74) *Attorney, Agent, or Firm* — Kraguljac Law Group, LLC

(57) ABSTRACT

Systems, methods, and other embodiments associated with secure firmware update in a bare metal cloud environment are described. In one embodiment, a trusted device for causing a component of a computing device to accept a firmware update is presented. The device includes a management interface configured to receive a command that authorizes a firmware update to the component. The device further includes a recovery device logic that is configured to generate a signal configured to cause the component to enter a recovery mode. The recovery mode configures the component to accept the firmware update. The device also includes an interface of the device that is configured to pass the signal to the component to cause the component to enter the recovery mode and accept the firmware update.

20 Claims, 7 Drawing Sheets

(51) Int. Cl.
*G06F 21/44* (2013.01)
*G06F 8/65* (2018.01)

(52) U.S. Cl.
CPC ............ *G06F 21/44* (2013.01); *G06F 21/575* (2013.01); *G06F 2221/033* (2013.01)

(58) Field of Classification Search
CPC ............ G06F 11/1456; G06F 11/0709; G06F 11/1438; G06F 11/1402; G06F 21/57; G06F 21/554; G06F 21/575; G06F 21/572; G06F 8/65
See application file for complete search history.

(56) References Cited

U.S. PATENT DOCUMENTS

| | | | |
|---|---|---|---|
| 8,788,801 B2 | 7/2014 | Wang et al. | |
| 9,135,436 B2 | 9/2015 | Lee | |
| 9,507,581 B2* | 11/2016 | Butcher | G06F 9/4416 |
| 9,804,855 B1* | 10/2017 | Paningipalli | G06F 9/4406 |
| 9,891,996 B2* | 2/2018 | Gopal | G06F 11/1417 |
| 10,003,597 B2* | 6/2018 | Corddry | H04L 67/535 |
| 10,078,565 B1* | 9/2018 | Petersson | G06F 11/181 |
| 10,452,570 B1* | 10/2019 | Liguori | G06F 9/45558 |
| 10,911,405 B1* | 2/2021 | Harland | H04L 63/0227 |
| 10,956,143 B2* | 3/2021 | Shivanna | G06F 8/65 |
| 10,997,296 B2* | 5/2021 | Heck | G06F 3/0622 |
| 11,120,136 B1* | 9/2021 | BeSerra | G06F 8/656 |
| 11,163,887 B2* | 11/2021 | Tuttle | G06F 9/4401 |
| 2003/0131119 A1* | 7/2003 | Noonan | H04L 41/00 709/253 |
| 2011/0289179 A1* | 11/2011 | Pekcan | H04L 49/65 709/213 |
| 2014/0351893 A1* | 11/2014 | Corddry | H04L 67/125 726/3 |
| 2016/0019116 A1* | 1/2016 | Gopal | G06F 21/64 714/19 |
| 2016/0180099 A1* | 6/2016 | Potlapally | G06F 21/602 713/189 |
| 2017/0004063 A1* | 1/2017 | Broderick | G06F 11/3495 |
| 2017/0097830 A1* | 4/2017 | Ehrenberg | G06F 21/602 |
| 2017/0180191 A1 | 6/2017 | Coburn et al. | |
| 2017/0302640 A1* | 10/2017 | Maletsky | H04L 9/3242 |
| 2018/0074843 A1* | 3/2018 | Smith | G06F 9/45558 |
| 2018/0075242 A1* | 3/2018 | Khatri | H04L 9/3263 |
| 2018/0089435 A1* | 3/2018 | Zander | G06F 21/575 |
| 2018/0165455 A1* | 6/2018 | Liguori | G06F 21/575 |
| 2019/0042228 A1* | 2/2019 | Nolan | G06F 8/64 |
| 2019/0073478 A1* | 3/2019 | Khessib | G06F 13/4282 |
| 2019/0251266 A1* | 8/2019 | Tuttle | G06F 21/55 |
| 2020/0034155 A1* | 1/2020 | Bilal | G06F 9/4406 |
| 2020/0257519 A1* | 8/2020 | Shen | G06F 8/65 |

OTHER PUBLICATIONS

Uplogix, Inc.; Bare Metal Restore: Rapid Replacement of Recalled Products, 2017; pp. 1-4, downloaded on May 21, 2019 from: https://uplogix.com/2017/03/bare-metal-restore/.
openstack.org; Bare Metal Trust Using Intel TXT, pp. 1-8, downloaded on May 21, 2019 from: https://specs.openstack.org/openstack/ironic-specs/specs/4.2/bare-metal-trust-using-intel-txt.html.
Fitzpatrick et al, SAVIORBURST, Aug. 14, 2015; 296, downloaded on Jun. 25, 2019 from: https://github.com/NSAPlayset/SAVIORBURST.

* cited by examiner

FULL SERVER RECOVERY ARCHITECTURE FOR CLOUD BARE METAL INSTANCES

CROSS REFERENCE TO RELATED APPLICATIONS

This disclosure claims the benefit of U.S. Provisional Patent Application Ser. No. 62/789,692 filed Jan. 8, 2019, titled "FULL SERVER RECOVERY ARCHITECTURE FOR CLOUD BARE METAL INSTANCES", inventors: Jaime Rangel Martinez, Paul Mc Millan, and Matt King, and assigned to the present assignee, which is incorporated by reference herein in its entirety.

BACKGROUND

Cloud computing can be described as the delivery of computing resources as a service over a network. There are two types of cloud computing offerings available that include traditional (or virtualized) clouds and bare metal (or non-virtualized) clouds.

The traditional cloud offers virtual machines, or emulations of a particular hardware server (computing system). In the virtual machines of a traditional cloud, storage, memory, and processing are abstracted away from the underlying hardware. The processing overhead of the virtualization layer can reduce the performance of the cloud computing services when compared against the performance of the underlying hardware.

A bare metal cloud, alternatively, is a service that offers access to hardware servers without the virtualization layer present in a traditional cloud. The absence of the virtualization layer can significantly improve performance of the cloud computing services, but comes with additional risks not faced by traditional cloud services.

Where a public cloud provider offers a bare metal cloud service, a hardware server may be used by a prior customer and then reused by a subsequent customer. In this bare metal environment, the customers are free to load any operating system or software stack on a server assigned to them, run any workload, and load any data. While the bare metal cloud service does impose some restrictions on access to the hardware server and all of its devices, the customer has far greater access to these devices than is available in a traditional cloud environment. Depending on the particular restrictions imposed, the customer may modify the firmware of the hardware server and some of its devices, such as a service processor, Basic Input/Output System (BIOS), Central Processing Unit (CPU), chipset, network controller, storage devices, Field-Programmable Gate Array (FPGA), Graphics Processing Unit (GPU), or other devices.

The bare metal environment thus presents risks to the confidentiality, integrity, and availability of the hardware server. A malicious customer using a hardware server may 'infect' the hardware server with malware implanted in the server or any of its devices. The malware may then break the confidentiality, integrity, and/or availability of the services offered to by the hardware server. Additionally, an incautious customer may inadvertently damage the firmware of the hardware server or any of its devices, negatively affecting confidentiality, integrity, and/or availability of the services offered by the hardware server.

To protect against these risks, a 'sanitize' or 'wipe' process is performed on the hardware server in between the use of the hardware server by the prior customer and the reuse of the hardware server by the subsequent customer. The wipe process erases all non-volatile data stored in the hardware server. This acts to protect the confidentiality of the prior customer when confidential data is stored in the hardware server when the prior customer has ceased using the hardware server. The wipe process also restores the soft firmware (re-writable firmware) stack of the hardware server. This acts to protect the subsequent customer when the prior customer maliciously implanted malware in the firmware or inadvertently damaged the firmware.

Further, methods for secure boot and updating the firmware stack used in the 'sanitize' or 'wipe' process often differ from device to device or vendor to vendor for the component devices of the hardware server. The non-uniform secure boot and firmware update procedures are disadvantageous, requiring a specialized approach for each type of device. The different methods each have their own drawbacks. For some component devices, the secure boot and firmware upgrade authentication routines are stored as immutable code in the component device's Read Only Memory (ROM). Such an implementation is generally secure, but the keys to sign the firmware may be freely available on the Internet, rendering the authentication unsecured. For other component devices, the secure boot and firmware update routines are included in the firmware of the component device itself. The firmware is stored in mutable non-volatile memory, for example, Serial Peripheral Interface (SPI) flash memory. In this latter case, there is no way to trust that the device booted securely or applied a trusted firmware image because it is the firmware itself that is performing the checks. A compromised firmware can fake these operations and nevertheless report information indicating that these operations have occurred. Further, if the firmware is damaged, it may not even accept the commands to boot securely or apply a firmware update.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
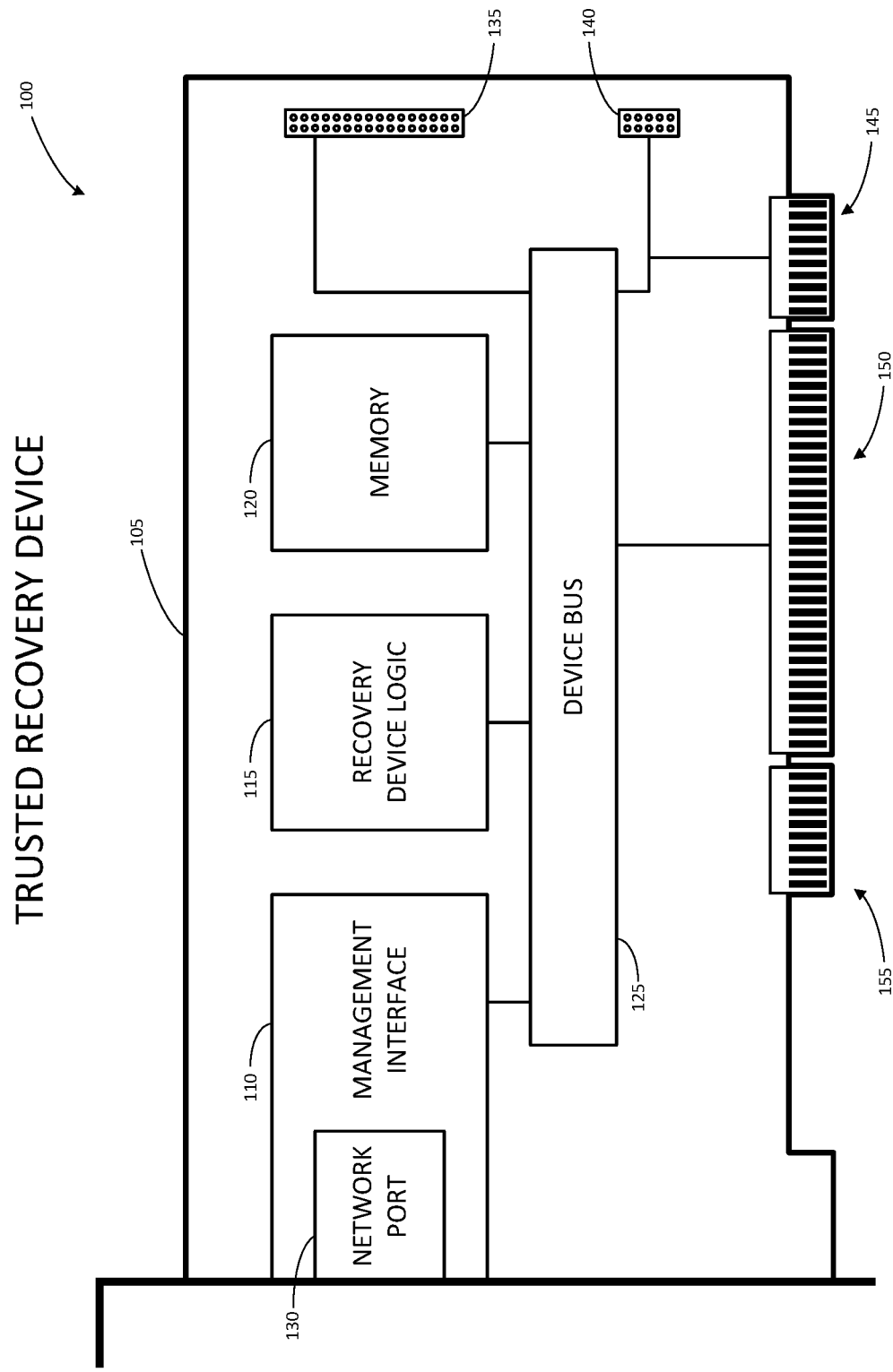
FIG. 1 illustrates one embodiment of a trusted recovery device.

Systems and methods are described herein that provide a full server recovery architecture for cloud bare metal server instances. In some embodiments, this introduces a new recovery interface device for providing firmware updates to component devices of the hardware server. Any manufacturer can adopt the solution that provides security rooted in hardware for firmware updates.

In one embodiment, the systems and methods adapt pre-existing functionality used during development and testing of the component devices. Generally, any component device with firmware will have a sideband recovery interface that is only physically accessible. This sideband recovery interface is not ordinarily exposed to the hardware server in which the component device is installed. Instead, the sideband recovery interface is generally only used during development of the component device or Return to Manufacturer Authorization (RMA) processing. In development or RMA situations, the sideband recovery interface is used to reload a fresh and known firmware image to the component device, or to debug the component device locally. Thus, in some embodiments, the sideband recovery interface may be referred to as a debug port or debug interface.

Placing the component device into a recovery mode enables control of the device through the sideband interface. Recovery mode is a special failsafe operating mode of the component device that allows direct configuration, debugging, and troubleshooting of the component device through the sideband recovery interface. The recovery mode is made up of a permanent set of functions of the component device that are included in the component device when it is manufactured. Code for the recovery mode of the component device is not part of soft firmware (re-writable firmware) of the component device. Instead, it is immutably recorded in a ROM of the component device and cannot be modified by access to the device. This prevents either accidental or intentional modification of the recovery mode code.

The recovery mode code is integral to the component device, and is generally present from the development stage of the device, where it may be employed to recover the component device from an inoperable state caused by testing of the device, for example by functions that can force the component device to accept a new firmware image. The recovery mode code may also include functions useful to debug the component device locally. Commands received through the sideband recovery interface of the component device are processed by the recovery mode code to execute these functions in accordance with the commands received. Thus, a component device that is executing functions defined by the recovery mode code is operating in recovery mode.

Access to a component device through the sideband recovery device allows for direct modification of the firmware of the component device in recovery mode. Different types of component devices may have different forms for entering recovery mode. In one embodiment, the sideband recovery interface is generally enabled during enabled during normal runtime operation of the component device. the recovery mode code continuously listens for commands received through the sideband recover interface. Receiving an input through the sideband recovery interface will cause the device to enter the recovery mode. In various embodiments, this may be caused by receiving any input, by receiving a command that is recognized by the recovery mode code, or by receiving a specific command that indicates that the component device should enter the recovery mode.

In another embodiment, the sideband recovery interface may not be enabled when the component device is operating normally. For example, the sideband recovery interface is enabled and the recovery mode code may listen for commands received through the sideband recovery interface for only a short listening period following the reset of the component device, after which the sideband recovery interface is disabled. This short period varies from manufacturer to manufacturer, and is generally up to a few seconds following a reset of the device. Once the device transitions out of this listening state at the end of the listening period, the sideband recovery interface is closed and recovery mode commands will not be accepted until after another reset of the component device.

In another embodiment, the component device will have an enable pin that indicates to the component device that it is to operate in recovery mode. In one example, the sideband recovery interface is enabled and the recovery mode code listens for commands received through the sideband recovery interface at any point while the component device is powered, provided a jumper is set for the enable pin that indicates that the device should operate in recovery mode. In another example, the sideband recovery interface is the recovery mode code listens for commands received through the sideband recovery interface only after (i) a jumper is set for the enable pin to indicate that the component device should operate in recovery mode and (ii) a reset is applied to the component device. In each example situation, the setting of the jumper can be simulated by providing a signal to the enable pin that simulates opening or closure of the jumper.

In one embodiment, a trusted recovery device is given access to a component device through the sideband recovery interface of the component device. The trusted recovery device can then be used to bring the component device into a known state. In some embodiments, this known state is a trusted state, if the content of the firmware of the component device is known. The trusted recovery device therefore provides a mechanism to bring the firmware of the component device into an authenticated state.

A firmware update applied through the trusted recovery device overcomes the limitations of 'sanitize' or 'wipe' processes that rely on the firmware of a component device to complete the update. The trusted recovery device bypasses the existing firmware of the component device, and forces the firmware update with the firmware provided to the trusted recovery device. Compromised or damaged firmware in the component device will be overwritten. As long as the firmware provided to the trusted recovery device is in a known state, the state of the firmware of the component device will also be in that known state after the firmware update.

Some existing systems are directed only to detecting a bad firmware state, and they do not allow for correction of a bad firmware state. But, for a 'sanitize' or 'wipe' process, bad state detection is not necessary. Correction of the bad firmware state by forcing firmware into a known state achieves correction of a bad firmware state if it exists, regardless of whether the bad state is detected or not.

In one embodiment, the systems and methods for recovery can be applied for any component device with a sideband recovery interface where the functionality of the component device depends on a microcontroller (μC) and its associated firmware. In one embodiment, discrete (detachable) expansion card component devices come with at least one instance of the microcontroller-firmware pair, but the recovery process applies to any other non-expansion card and/or integrated component device as well, such as chipset, baseboard management controllers, embedded network controller, etc.

Example Trusted Recovery Device

Referring now to FIG. 1, one embodiment of a trusted recovery device 100 is shown. The device 100 is an expansion card 105 that is configured to be installed in an expansion slot of a hardware server. In one embodiment, the trusted recovery device 100 is a PCI expansion card. The trusted recovery device 100 has a management interface 110, recovery device logic 115, and memory 120 interconnected by a bus 125. The management interface 110 includes a network port 130. The device 100 includes an enable register 135 connected by bus 125 to recovery device logic 115. The enable register 135 is shown with pins (for example 32 pins) for selectively enabling or disabling sideband interfaces of component devices of the hardware server.

The trusted recovery device 100 drives a device recovery interface to the various sideband interfaces of the component devices of the hardware server. In one embodiment, the device recovery interface of the trusted recovery device 100 includes a recovery bus header 140 of General Purpose Input/Output (GPIO) pins for interfacing with a recovery bus cable. In another embodiment, the device recovery interface of the trusted recovery device 100 includes a set of recovery bus contacts 145 for interfacing with an in-motherboard recovery bus. In yet another embodiment, both recovery bus header 140 and recovery bus contacts 145 are included in device 100.

The recovery bus header 140 pins and recovery bus contacts 145 of the device recovery interface should be of a sufficient number to wrap the interfaces for most common recovery protocols, such as, for example 10 GPIO pins/contacts. Thus, the recovery bus header 140 and recovery bus contacts 145 of the device recovery interface are selectably able to behave as, for example, Joint Test Action Group (JTAG), Universal Asynchronous Receiver-Transmitter (UART), Inter-Integrated Circuit (I2C), System Management Bus (SMBUS), Serial Peripheral Interface (SPI), Low Pin Count interface (LPC), Secure TRansfer of Association Protocol (STRAP), or other recovery interfaces. In one embodiment, the recovery bus header 140 pins and recovery bus contacts 145 are of a higher number in order to wrap the interfaces for extended recovery protocols, such as 38 pin Matched Impedance ConnecTOR (MICTOR) or 60 pin eXtended Debug Port (XDP). In one embodiment, the device recovery interface is a universal serial bus (USB) interface.

The device recovery interface may be connected to the side band recovery interfaces of the component devices by either the in-motherboard recovery bus or the recovery bus cable. The recovery bus (whether in-motherboard or a separate cable) should have at least the same number of wires as the device recovery interface, so that it is sufficient to aggregate all the straps for each component device.

The device 100 may additionally include other contacts 150 for interfacing with an expansion bus of a motherboard. The device 100 also includes a set of power and other reserved contacts 155 supporting the operation of device 100.

In one embodiment, the management interface 110 connects trusted recovery device 100 to a management network (or control plane), such as an Ethernet network, through network port 130. The management network is used by a cloud provider (the operator of the hardware server) to command restoration of the hardware server to a known and/or trusted state. Trusted recovery device 100 accepts commands from the management network through the management interface 110. Recovery device logic 115 parses the commands from the management network to identify the target component devices for the command and the appropriate recovery protocol for the command to the target component device. The locations of the target component devices and the appropriate recovery protocols may be stored in and retrieved from memory 120. All information stored in memory 120 is stored in various data structures. Recovery device logic 115 generates appropriate signals to enable register 135 to place a target component device into recovery mode, and to place non-target component devices in a non-recovery mode. Recovery device logic 115 generates appropriate signals to recovery bus header 140 and/or recovery bus contacts 145 to send the command to the target component device using the appropriate recovery protocol.

In one embodiment, the command signals received from the management network are abstracted away from the specific architecture of the hardware server and indicate that a command is to be sent to a particular component device. This prevents incorrect signals being triggered by the management network, which may damage components. The electrical signals sent to the device are translated by the trusted recovery device from the received commands. For example, a command may be received from the management network through management interface 110 indicating that a specific component device should be placed into recovery mode. The recovery device logic 115 retrieves from memory 120 the pins of enable register 135 associated with a switch connected to a debug interface/sideband recovery interface of the specific component device. The recovery device logic 115 then toggles the pins to send a signal to the activate the switch for the specific component device, while also sending a signal to un-activate switches connected to other component devices.

Further, the management network may provide a new firmware image for a particular component to the trusted recovery device 100. In one embodiment, the trusted recovery device 100 acts as a proxy, temporarily storing the image in memory 120 and forwarding the new firmware image to the particular component. The new firmware image may replace a previous firmware image that was previously held in memory 120. In one embodiment, the new firmware image may be used for only one firmware update. In another embodiment, the new firmware image may remain in memory 120 and be used though one or more firmware update cycles. In either case, the new firmware image is forwarded to the particular component during a firmware update cycle either through the mainband interface with the motherboard (a higher bandwidth option), or through the recovery interface (a low bandwidth option). The selection of path for delivering the update may depend on the type of component device that the update is being delivered to. For example, a firmware update to other PCI devices may readily be delivered through the mainband PCI bus. However, a firmware update to a storage device may be best delivered through the recovery interface, if the firmware of the storage device cannot be updated through the storage device interface.

In some embodiments, the trusted recovery device 100 is simple, and does not enforce an order of operations for the firmware updates to the devices. In this case, the sequence of operations is managed by the management network.

In one embodiment, the trusted recovery device serves to anchor trust both for secure boot and firmware recovery. Thus, the trusted recovery device 100 may be referred to as a "Root of Trust." The trusted recovery device 100 can authenticate the firmware and/or commands that it receives. For example, the trusted recovery device 100 may be provisioned with keys that can used to authenticate firmware and/or commands received through management interface 110. These keys may be stored in memory 120. The authentication may be performed by recovery device logic 115. Before new firmware or a command is transmitted to the trusted recovery device 100 over the management network, the firmware or command may be signed with a trusted key. The signed firmware or command is then sent to the trusted recovery device 100. The recovery device logic 115 then authenticates that the firmware or command is from a trusted source using the trusted key and one or more of the provisioned keys stored in memory 120. In one embodiment, the trusted recovery device 100 will only execute a command if the command is successfully authenticated. In one embodiment, the trusted recovery device 100 will only apply a firmware update to a component device if the new firmware is successfully authenticated. In one embodiment, the trusted recovery device 100 will only retain the new firmware in memory 120 if the new firmware is successfully authenticated. Otherwise, if the authentication of the command or new firmware fails, the trusted recovery device 100 will not execute the command or use the new firmware. Further, the trusted recovery device 100 will not apply a firmware update using un-authenticated firmware. This authentication function is one function that the trusted recovery device 100 performs as a "root of trust."

Another function that the trusted recovery device performs as a "root of trust" is producing attestation BLOBs (Binary Large OBject). An attestation BLOB is a verifiable status report from the trusted recovery device 100. In one embodiment, the trusted recovery device 100 may produce firmware attestation BLOBs, which are verifiable status reports on the firmware status of a component device that is operating in the hardware server. These BLOBs may be requested and provided at runtime of the hardware server. In one embodiment, a request for an attestation BLOB regarding the firmware of a particular component device may be received through the management interface 110 of the trusted recovery device 100. The recovery device logic 115 parses the request for the BLOB to identify the request and to identify the particular component device. The recovery device logic 115 then determines what firmware version is being run by the particular component device. For example, a record of the version applied by the trusted recovery device in the last successful update may be retrieved from memory 120. Or, in another example, recovery device logic 115 may request that the particular component device report the version to the trusted recovery device. In a further example, a record of the success or failure of a previous firmware update may be retrieved from memory 120. The recovery device logic 115 then compiles a report indicating the firmware status of the particular component device. The report may include a firmware status of other component devices in addition to the firmware status of the particular component device. The recovery device logic 115 signs the report using one or more of the provisioned keys stored in memory 120, and forms the attestation BLOB. The trusted recovery device 100 then transmits the attestation BLOB from the management interface 110 through the management network to one or more other computers associated with the management network. The attestation BLOB enables these other computers to verify that the report comes from the trusted recovery device. The report will allow decisions to be made based on the status of the status of the component returned by the attestation BLOB. For example, the report may describe a firmware state that is trusted or satisfactory, is not trusted or satisfactory, and this may form the basis for decisions regarding the use of the hardware server that includes the particular component device. This decision, for example, can include determining whether or not to apply a firmware update.

Example Trusted Recovery Device Installed in Computing Device

Figure 2A:
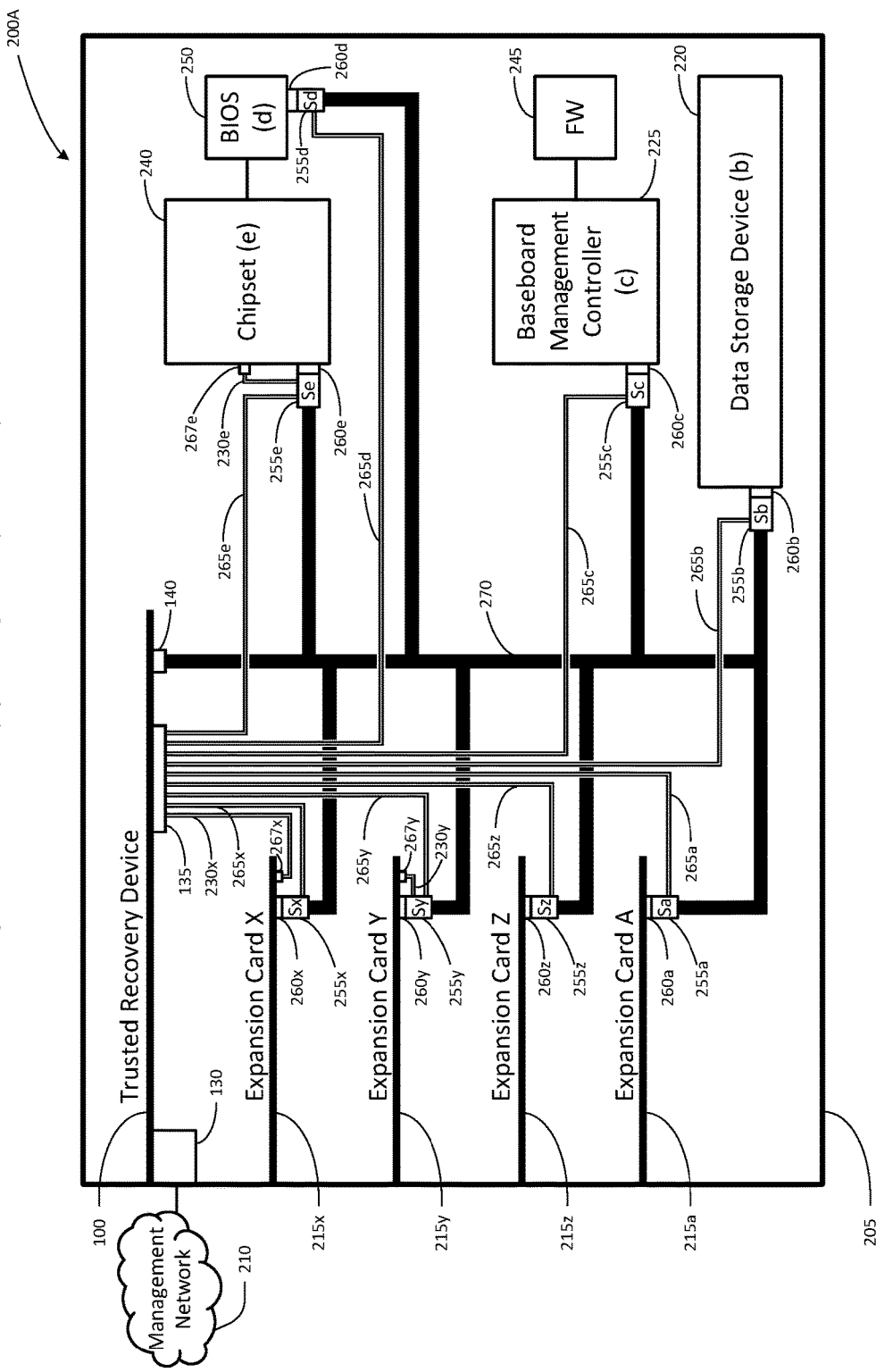
FIG. 2A illustrates one embodiment of a trusted recovery device installed in a hardware server.

Referring now to FIG. 2A, one embodiment of a trusted recovery device 100 installed in a hardware server 200A is presented. Hardware Server 200A may be, for example, an ORACLE® X5, X6, X7, or X8 series server. Here, hardware server 200A is a bare metal instance used to provide cloud computing services. The trusted recovery device 100 is an expansion card 105 installed in an expansion slot of motherboard 205 of hardware server 200A. Management interface 110 is connected by network port 130 to an infrastructure management system or network control plane, such as management network 210.

In one embodiment, management interface 110 is an ethernet interface to a dedicated/segregated management network 210. In one embodiment, the management interface 110 is a serial interface to a serial concentrator associated with the management network 210. In one embodiment, the management interface is a universal serial bus interface to a USB hub associated with the management network 210. As a practical matter, to maintain security, it is desirable that management or control of the trusted recovery device 100 be restricted to management or control through the management interface 110, and not through the mainband interface with the hardware server. Here, the management network 210 should be inaccessible to the customers using the hardware server.

The hardware server 200A can include many component devices, such as expansion cards (Peripheral Component Interconnect Express (PCIe), Accelerated Graphics Port (AGP), etc.), Baseboard Management Controllers (BMC), Platform Controller Hubs (PCH), a Basic Input/Output System (BIOS), storage devices, and Central Processing Units (CPU). Each component device may have a sideband recovery interface. The trusted recovery device can be used to manage the firmware of multiple each of these component types. The trusted recovery device can then manage the firmware of each component device installed in a hardware server.

Here, the component devices include other expansion cards (expansion card X 215x, expansion card Y 215y, expansion card Z 215z, and expansion card A 215a); data storage devices 220; baseboard management controllers 225, and chipset 240. The baseboard management controller 225 is associated with firmware ROM 245. The chipset 240 is connected to a BIOS ROM 250.

Each of the component devices (215x, 215y, 215z, 215a, 220, 225, and 240) may include a sideband recovery interface 260x-260e. In some configurations, the sideband recovery interface of a component device may be accessed through an additional set of GPIO pins connected to (or configured to be connected to) the motherboard. In other configurations, the sideband recovery interface also may be accessed through an additional set of pins configured to be connected to a cable connector, such as a ribbon cable connector.

A recovery bus cable 270 is attached between each of the sideband recovery interfaces 260x-260e and the recovery bus header 140. The recovery bus cable 270 may be a cable such as a ribbon cable. The recovery bus header 140 transmits signals to the component devices (215x, 215y, 215z, 215a, 220, 225, and 240) through the recovery bus cable 270. The signals may command the component device to accept a firmware update and/or provide the firmware update to the component.

A switch 255x-255e is placed between the endpoints of the recovery bus cable 270 and each of the sideband recovery interfaces 260x-260e. The switch 255x-255e operates to block or allow the passage of signals between the sideband recovery interfaces 260x-260e and recovery bus cable 270. Each switch 255x-255e has activation pins connected by an enable line 265x-265e to pins of enable register 135. Each enable line 265x-265e may be, for example, two wires connected between two activation pins of a switch (such as 255x), and two pins of the enable register 135. Each switch 255x-255e is respectively controlled through one of enable lines 265x-265e, as shown in FIG. 2A. For example, the pins of the enable register 135 associated with each enable line 265x-265e may send a signal through the enable line to the activation pins directing the opening or closing of each switch 255x-255e according to the operation of recovery device logic 115. Thus, the enable lines 265x-265e allow the trusted recovery device 100 to selectively determine whether signals sent through the recovery bus cable 270 are received or not.

For example, if a command sent through recovery bus cable 270 is to be received by expansion card X 215x, but is not to be received by any of the other component devices (215y, 215z, 215a, 220, 225, and 240), enable line 265x will be activated to cause switch Sx 255x to allow the passage of signals. The remaining enable lines 256y-265e will remain un-activated, and the associated switches 255y-255e will remain closed to block the passage of signals. In this configuration of switches, the command sent through recovery bus 270 will be received only at sideband recovery interface 260x, and will be blocked from being received at the other sideband recovery interfaces 260y-260e.

Thus, if a signal sent through the recovery bus cable 270 is appropriate for a component device, a signal to activate the switch associated with that component device is sent through the enable line associated with that component device. In one embodiment, if a signal sent through the recovery bus cable 270 is appropriate for multiple component devices, a signal to activate the enable jumper is sent through the enable line associated with each of the multiple component devices. In this way, the trusted device 100 can force other component devices (215x, 215y, 215z, 215a, 220, 225, and 240) to accept firmware provided by the trusted device 100.

The trusted recovery device operates as a master device, while sideband recovery interface of each component device operates in slave mode. Each component device must have its sideband recovery interfaces activated only when the signals sent though the device recovery interface is appropriate for the component device. Otherwise the component device may be damaged. Therefore, the trusted recovery device 100 also drives enable lines connected to the switches of corresponding component devices. The signals sent over the enable lines activate the switches attached to the corresponding component devices so that the sideband recovery interface of the component device is controlled by the trusted device. The trusted recovery device then may sequentially send firmware updates through the device recovery interface to all the component devices with switches activated to allow the passage of the firmware update.

In addition to the enabling performed with the enable register 135, enable lines 265x-265e and switches 255x-255e, a further type of enabling may occur to cause activation of recovery mode in some component devices. In one embodiment, the component devices may include an enable pin that indicates to the component device that it is to operate in recovery mode. Ordinarily, the enable pin is activated by placing or removing a jumper to complete or break a circuit that toggles the recovery mode. As discussed above, in one example the recovery mode may be activated by the setting of this jumper during runtime, and in another example, the recovery mode is activated by the setting of this jumper at the time of a reset of the component device.

In one embodiment, the trusted recovery device 100 is configured to send a signal that is configured to cause a simulated setting of the jumper on the enable pins that causes the component to activate the recovery mode and accept communication through the sideband recovery interface of the component device. Various example configurations for controlling the simulated jumper setting are shown in FIG. 2A. These example configurations may not necessarily each be compatible for concurrent use in the same embodiments.

In one example, the signal to simulate an "activate" jumper setting of the enable pins is delivered over recovery bus cable 270 to a switch, for example switch 255y. The switch (255y) then recognizes the signal to simulate the "activate" jumper setting. In response, switch 255y simulates the "activate" jumper setting through a jumper pin enable line 230y between switch 255y and enable pin 267y. In one example, switch 255y continues simulating the "activate" jumper setting until the signal to simulate the jumper setting ceases to be received by the switch 225y. In another embodiment, switch 255y continues simulating the "activate" jumper setting until switch 255y receives and recognizes a signal to simulate a "de-activate" jumper setting. In response, switch 255y will simulate a "de-activate" jumper setting through jumper pin enable line 230y between switch 255y and enable pin 267y.

In another example, the switch enable signal received from the enable line (for example, from enable line 265e) is passed through the switch 255e over a jumper pin enable line 230e to enable pin 267e. Thus, whichever signal is passed to the switch to activate the switch to pass signals from recovery bus 270 to sideband recovery interface 260e is also used to simulate the "activate" and "de-activate" jumper settings.

In another example, the signal simulating the "activate" and "de-activate" jumper settings is delivered directly to the enable pin (for example, to enable pin 267x) by a dedicated jumper pin enable line 230x from the enable register 135. In each of these examples, the "activate" jumper simulation may, for example, may simulate a closed circuit through the enable pins 267x, 267y, and 267e. Similarly, the "de-activate" jumper setting may, for example, may simulate an open circuit through the enable pins 267x, 267y, and 267e. However, the configuration with a dedicated jumper pin enable line (such as jumper pin enable line 230x) may enable (i) handling alternative simulation signals which may diverge from the signals used to control the switch, or (ii) signaling the enable pin in embodiments where the switch is not configured to detect the signals to simulate the "activate" and "de-activate" jumper settings.

In one embodiment, a "hard" reboot, in which the power to the component devices is temporarily discontinued, is required to complete one or more of (i) entry into recovery mode for the component device, (ii) exit from recovery mode for the component device, and (iii) a firmware upgrade to the component device. In one embodiment, as a practical matter, the component devices (215x, 215y, 215z, 215a, 220, 225, and 240) should be in the same power domain as the trusted recovery device 100. In another embodiment, each component device (215x, 215y, 215z, 215a, 220, 225, and 240) should be powered at the same time that the trusted recovery device 100 is providing any signals or firmware update to the component device. In each of these embodiments, power to a component device that is the intended recipient of signals or updates should be maintained, or the update may fail. In one embodiment, the trusted recovery device 100 is a PCI expansion card drawing power from hardware server 200A, and each component device (215x, 215y, 215z, 215a, 220, 225, and 240) is also drawing power from hardware server 200A, placing all the trusted recovery device 100 each component device (215x, 215y, 215z, 215a, 220, 225, and 240) in the same power domain.

In some embodiments, the motherboard 205 and/or component devices may require modification to expose the pins for the enable jumpers and/or sideband interfaces of the component devices.

Alternate Installation Configuration of Trusted Recovery Device

Figure 2B:
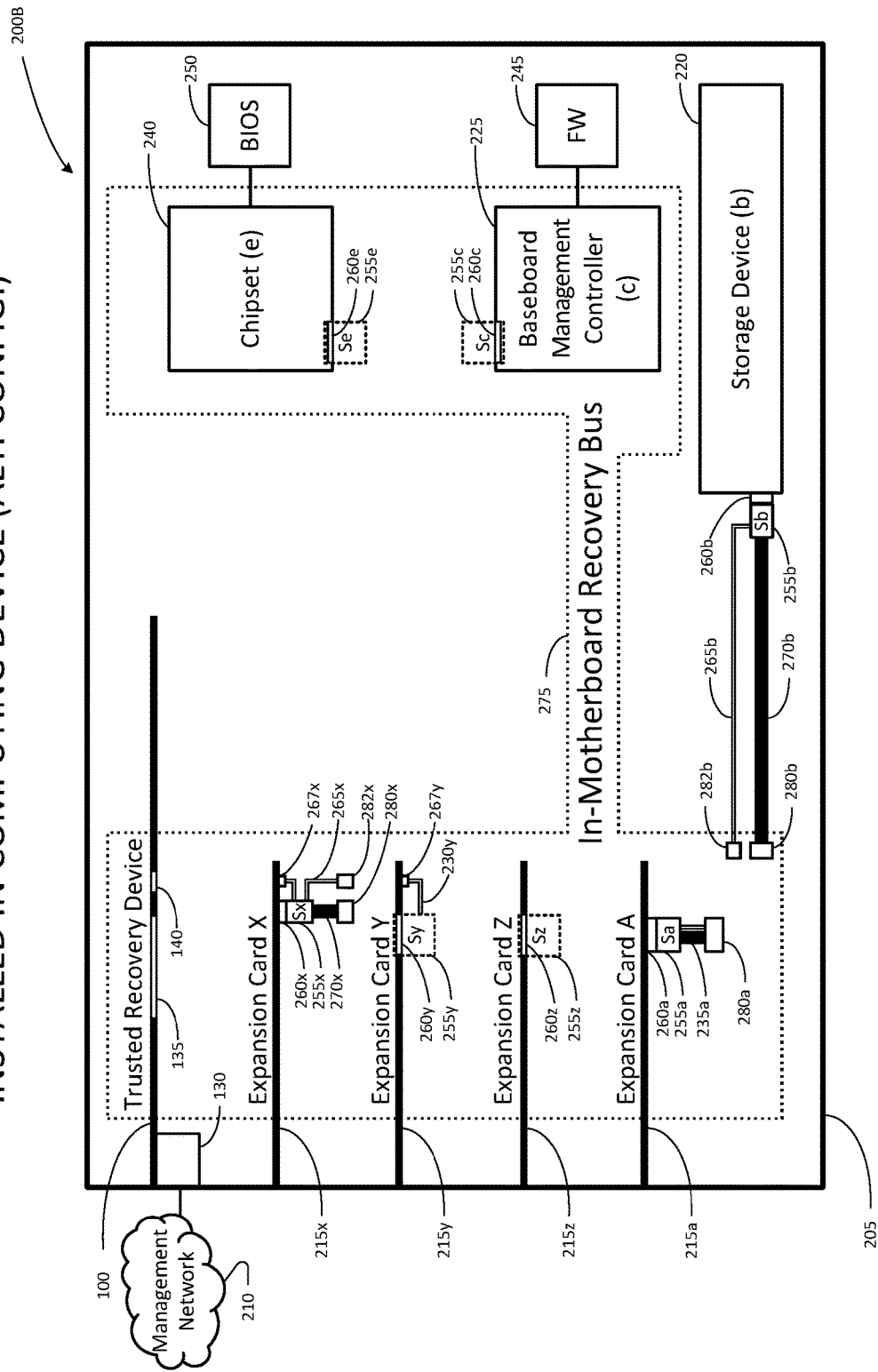
FIG. 2B illustrates another embodiment of a trusted recovery device installed in a hardware server.

FIG. 2B illustrates another embodiment of a trusted recovery device 100 installed in a hardware server 200B. In one embodiment, each component device with firmware includes a sideband recovery interface as an extra set of contacts or pins connected to the motherboard 205 of the hardware server 200B. In one embodiment, the recovery bus header 140 and recovery bus cable 270 are replaced by recovery bus contacts 145 that interface with an in-motherboard recovery bus 275. In this configuration the motherboard may be specifically designed with a trusted recovery device header which connects the trusted recovery device 110 to the component devices through an in-motherboard device recovery bus 275. In some embodiments, the in-motherboard recovery bus 275 is a discrete bus included in the motherboard 205.

In one embodiment, the enable register 135 and enable lines 265x-265e remain configured as described with reference to FIG. 2A, and retain the same functions. Various example configurations for (i) placement of the switches at the endpoints of the in-motherboard recovery bus 275 and (ii) controlling the simulated jumper setting are shown in FIG. 2B. These example configurations may not necessarily each be compatible for concurrent use in the same embodiments.

In one example configuration, the motherboard 205 may be specifically designed with in-motherboard switches, as shown at switches 255y, 255z, 255c, and 255e. In this configuration, the sideband recovery interface of the component devices is designed as an extra set of contacts or pins for connection to the motherboard 205 at the switch, as shown with sideband recovery interfaces 260y, 260z, 260c, and 260e. The motherboard 205 includes a header connected to these switches 255y, 255z, 255c, and 255e that is configured to accept the connection to the contacts or pins of the sideband recovery interfaces 260y, 260z, 260c, and 260e. In some embodiments, a jumper pin enable line 230y may be connected between the switch 255y and enable pin 267y in order to simulate the "activate" and "de-activate" jumper settings as described above.

In another example configuration, the motherboard 205 may not use in-motherboard switches to control access to sideband recovery interfaces, as shown with reference to Expansion Card X 215x, Expansion Card A 215a, and Storage Device (b) 220. This may be desirable when the sideband recovery interface of the component devices is not designed for direct interface with the motherboard 205. In these configurations, an in-motherboard recovery bus header, such as recovery bus headers 280x, 280a, and 280b, may be provided. In one embodiment, recovery bus cable, such as recovery bus cables 270x and 270b, can then be used to connect the switches connected to the sideband recovery interfaces to the in-motherboard recovery bus headers. For example, switch 255x connected to sideband recovery interface 260x of Expansion Card X 215x may be connected to recovery bus header 280x with recovery bus cable 270x; or switch 255b connected to sideband recovery interface 260b of data storage device 220 may be connected to recovery bus header 280b with recovery bus cable 270b. In one embodiment, enable lines as described above are connected between the switches and a separate in-motherboard enable line header, for example as shown with enable line header 282x and switch 255x, or as shown with enable line header 282b and switch 255b. In another embodiment, the enable line header is unified with the recovery bus header, as shown at unified recovery bus header 280a. A combined recovery bus and enable line cable 235a may be used to connect the switch 255a with the unified recovery bus header 280a.

Signals commanding a component to accept a firmware update and/or providing the firmware update to the component are sent by the trusted recovery device 100 through the recovery bus contacts 145 of expansion card 105 to the in-motherboard recovery bus 275, and from the in-motherboard recovery bus 275 to the activation pins of the switches 255x-255e. When a switch is activated to allow the passage of signals, the signals are passed through to the sideband recovery interfaces 260x-260e of the components (215x, 215y, 215z, 215a, 220, 225, and 240). This may be through a header attached to an in-motherboard switch and slot contacts or pins of the component device or through a recovery bus header and cable attached to the switch attached to the component device.

In one embodiment, the switches may be addressable. A unique address for each individual switch may be applied. This may be accomplished on discrete switch components for example by including an appropriate configuration of dual in-line package (DIP) switches and appropriate underlying address circuitry on each switch to allow a static address to be manually entered. Where the switches are integrated with the motherboard, a static address may be provided. The enable register can be used to perform the addressing. Rather than using individual enable lines between the enable register and the individual switches, an enable bus could be connected between the enable register and the individual addressable switches. For example, using an 8-line enable bus, a trusted recovery device can support $2^8$ (256) possible individually addressable switches. In another embodiment, the enable lines or enable bus may be multiplexed to only allow the appropriate signals to be received by their associated component devices.

Trusted Recovery Device Integrated With Motherboard

Figure 2C:
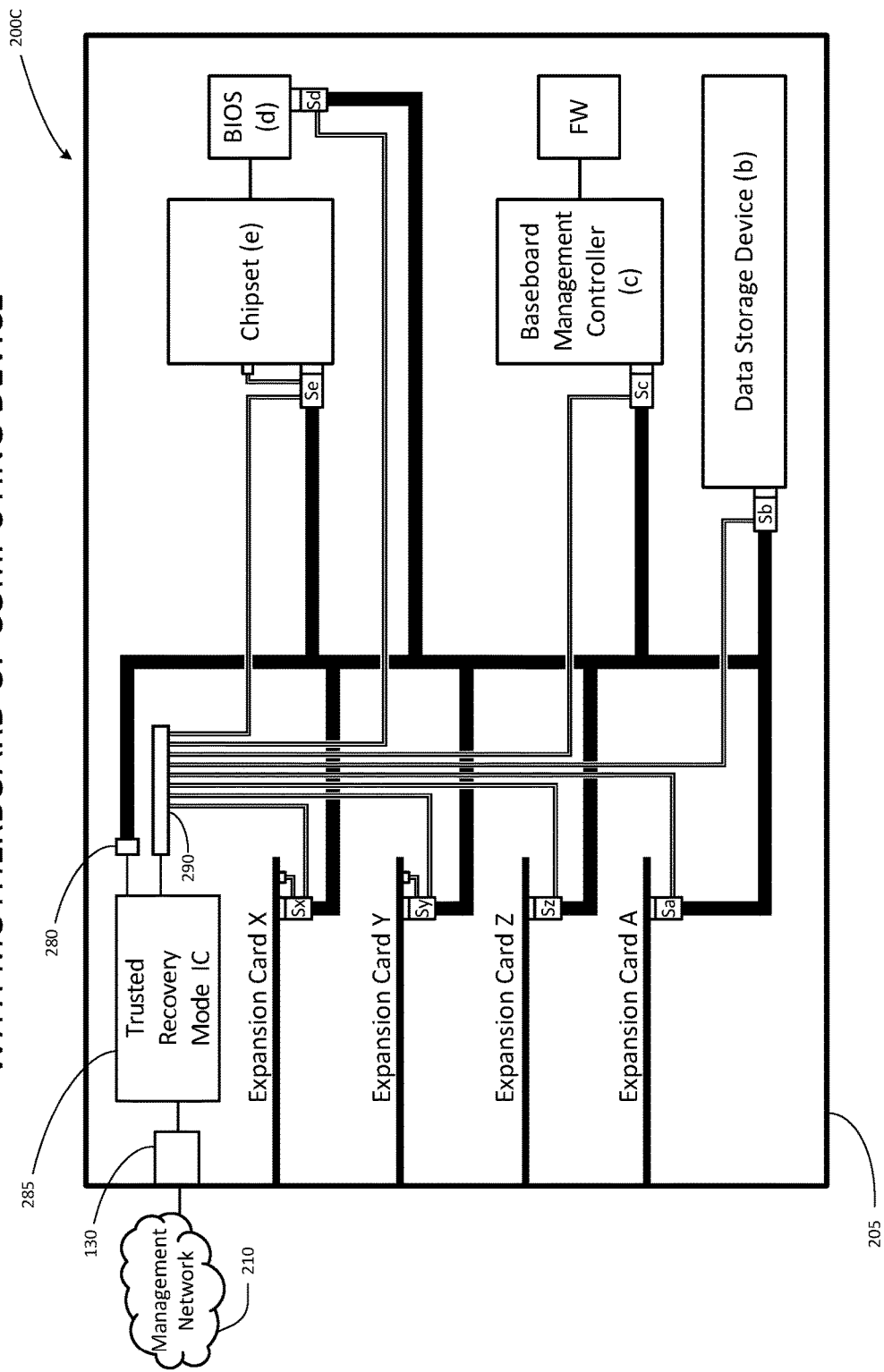
FIG. 2C illustrates one embodiment of a trusted recovery device that is integrated with the motherboard of a hardware server.

FIG. 2C illustrates one embodiment of a trusted recovery device 100 that is integrated with the motherboard of a hardware server 200C. In this embodiment, the trusted recovery device 100 is integrated with the motherboard 205 rather than mounted on an expansion card 105. In some embodiments, the functions of the management interface 110, the recovery device logic 115, and the memory 120 are packaged in one or more integrated circuits 285 (such as ASICs) mounted to the motherboard 205. The integrated circuit(s) 285 are connected to dedicated network port 130, an in-motherboard recovery bus header 280, and an in-motherboard enable header 290. The in-motherboard enable header 290 performs the same function as described for the enable register 135. While FIG. 2C shows enable lines and a recovery bus cable similar to those shown and described with reference to FIG. 2A, this is only one embodiment. In other embodiments where the trusted recovery device 100 is integrated with the motherboard 205, the trusted recovery device 100 may interface directly with an in-motherboard recovery bus, such as shown and described with reference to FIG. 2B.

Other Hardware Installations

In some embodiments, the trusted recovery device is installed in devices other than a hardware server. Some embodiments of the trusted recovery device are appropriate for use with all computing systems that have component devices with firmware. Accordingly, the trusted recovery device may also be installed in and manage the firmware of network equipment such as switches, routers, and firewalls.

Cloud Computing System Using Trusted Recovery Devices

Figure 3:
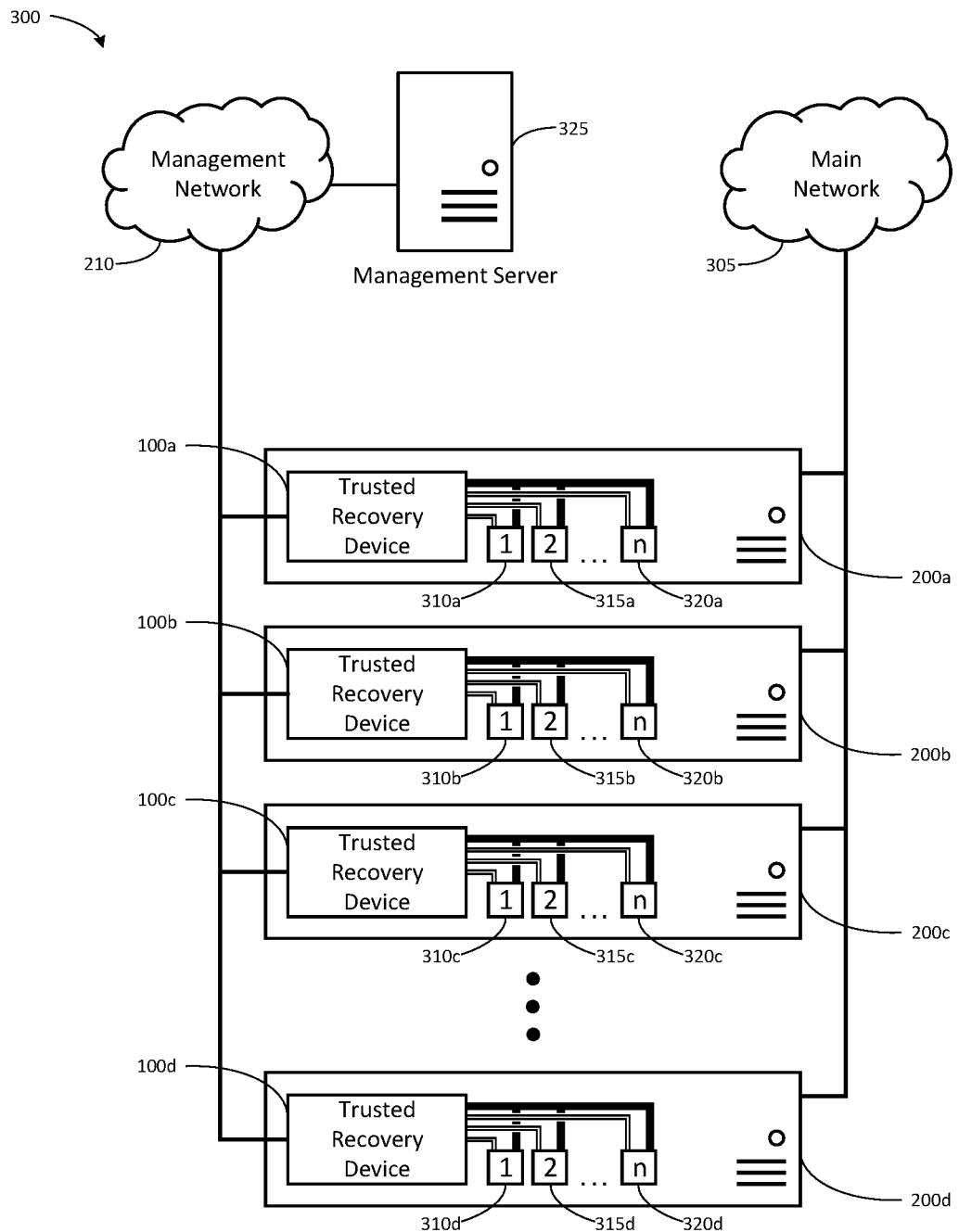
FIG. 3 illustrates one embodiment of a cloud computing system configured to employ the trusted recovery device to apply a firmware update.

FIG. 3 illustrates one embodiment of a cloud computing system 300 configured to employ the trusted recovery device 100 to apply a firmware update. In this embodiment, multiple hardware servers 200*a*-200*d* are interconnected by a main network 305, and a management network 210. The management network 210 is connected to a trusted recovery device 100*a*-100*d* installed in each of the multiple hardware servers 200*a*-200*d*. Each trusted recovery device 100*a*-100*d* is connected to one or more component devices 310*a*-310*d*, 315*a*-315*d*, and 320*a*-320*d*, installed in the hardware servers 200*a*-200*d* as described with reference to FIGS. 2A-2C. The management network 210 is also connected to a management server 325. Management server 325 operates the infrastructure management system or network control plane. Management server 325 issues commands to trusted recovery devices 100*a*-100*d*.

In one embodiment the management network 210 and the main network 305 are segregated from each other, either logically or physically or both. Customer users of the cloud computing system 300 access the hardware servers 200*a*-200*d* through main network 305. The management network 210 is not generally accessible by customer users of the cloud computing system 300. The management network 210 is used for providing commands and data to the trusted recovery devices 100*a*-100*d* from the management server 325. These commands and data are used during a wipe process between uses of the hardware servers 200*a*-200*d* by different customers to force a firmware update of one or more of the component devices 310*a*-310*d*, 315*a*-315*d*, and 320*a*-320*d* installed in the hardware servers 200*a*-200*d*. The commands and data provided through the management network include: (i) commands to perform a firmware update to one or more component devices 310*a*-310*d*, 315*a*-315*d*, and 320*a*-320*d* installed in the hardware servers 200*a*-200*d*; (ii) commands requesting an attestation BLOB regarding the status of one or more component devices 310*a*-310*d*, 315*a*-315*d*, and 320*a*-320*d* installed in the hardware servers 200*a*-200*d*; and (iii) firmware update packages (that is, new firmware) to be stored in trusted recovery device 100*a*-100*d*, and, following an appropriate command, installed in one or more component devices 310*a*-310*d*, 315*a*-315*d*, and 320*a*-320*d* installed in the hardware servers 200*a*-200*d*.

The management network 210 is secured by appropriate network security techniques to prevent unauthorized access to or intrusion on the trusted recovery devices 100*a*-100*d*. In some embodiments, the trusted recovery devices can support secure communications protocols in communications with management network 210, such as employing Transport Layer Security (TLS) protocol connections.

Method for Firmware Updates Using Trusted Recovery Devices

Figure 4:
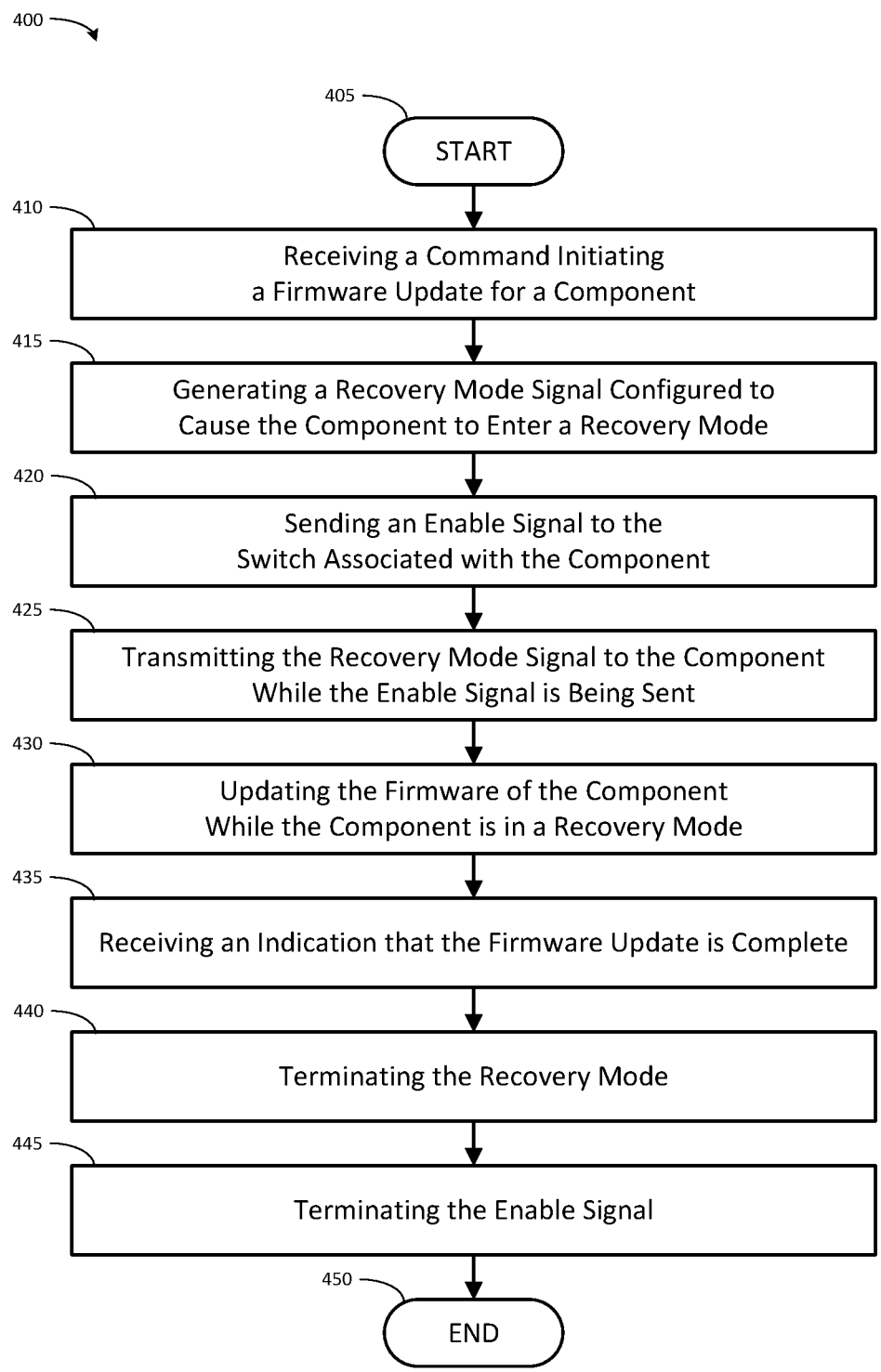
FIG. 4 illustrates one embodiment of a method associated with applying a firmware update using the trusted recovery device.

FIG. 4 illustrates one embodiment of a method 400 associated with applying a firmware update using the trusted recovery device 100. In one embodiment, the method 400 may be performed by a system such as cloud computing system 300, as configured and described with reference to FIG. 3.

The method 400 may be initiated based on various triggers, such as receiving a signal (or parsing stored data) indicating (i) that a customer has completed the use of one or more hardware servers 200*a*-200*d*; (ii) that an administrator of the system 300 has initiated the method 400; (iii) that method 400 is scheduled to be initiated at defined times or time intervals.

The method 400 initiates at start block 405 and processing continues to process block 410. At process block 410, a command initiating a firmware update for a component is received. In one embodiment, the command may have been sent by management server 325 through management network management network 210 to be received by management interface 110 of a trusted recovery device (such as trusted recovery devices 100*a*-100*d*) installed in a hardware server (such as the hardware servers 200*a*-200*d*). This command may authorize a firmware update for a component of the hardware server (such as one of component devices 310*a*-310*d*, 315*a*-315*d*, and 320*a*-320*d*). The command may have been sent as part of a 'wipe' or 'sanitize' process for the hardware server. Thus, the command may be sent following the conclusion of a first cloud computing customer's use of the hardware server, and prior to a subsequent cloud computing customer's use of the hardware server. The management server 325 may send the command in response to receiving an indication that the first cloud computing customer's session has terminated. Further embodiments of this step are discussed elsewhere in this document. Process block 410 completes and processing continues at process block 415.

At process block 415, a recovery mode signal configured to cause the component to enter a recovery mode is generated. In one embodiment, the recovery mode signal is generated by recovery device logic 115 in response to management interface 110 receiving the command and passing the command to recovery device logic 115. Recovery device logic 115 parses the command to identify which component (such as one of component devices 310a-310d, 315a-315d, and 320a-320d) is to receive the signal, retrieves from memory 120 information regarding the component, and generates a signal appropriate to the type of the component. Further embodiments of this step are discussed elsewhere in this document. Process block 415 completes and processing continues at process block 420.

At process block 420, an enable signal is sent to the component. In one embodiment, the addressing of the components is stored in the memory 120, and the address of the correct switch for the component is retrieved by the recovery device logic 115. The enable signal is sent through the enable header (135 or 290) to the switch connected to the sideband recovery interface of the component. The enable signal may include a signal indicating that the switch should activate to allow the passage of signals (including commands and data) through the switch. Further, while the enable signal is sent to the activation pins of the switch associated with the component, a non-enable signal is sent through the enable header to the activation pins of switches associated with each other component. The enable and non-enable signals may be simple continuous binary signals, for example where a power or "1" signal is the enable signal to allow passage of signals through the switch, and where a non-power or "0" signal is the non-enable signal to prevent passage of signals through the switch. This prevents the other components from receiving a recovery mode signal not intended for them. Further embodiments of this step are discussed elsewhere in this document. Process block 420 completes and processing continues at process block 425.

At process block 425, the recovery mode signal is transmitted to the component while the enable signal is being sent. In one embodiment, the recovery mode signal is a sequence of one or more units of information making up commands or data. In one embodiment, the recovery mode signal is sent through the recovery bus (cable 270 or in-motherboard 275) through the switch to the sideband interface of the component. In one embodiment, the enable signal should be transmitted continuously while the recovery mode signal is being sent through the sideband interface of the component, or the switch connected to the sideband interface will close and the recovery mode signal will be dropped. The recovery mode signal will place the component in a recovery mode that will accept a firmware update. Further embodiments of this step are discussed elsewhere in this document. Process block 425 completes and processing continues at process block 430.

At process block 430, the firmware of the component is updated while the component is in the recovery mode. In one embodiment, updated firmware is provided to the component. In one embodiment, the updated firmware is provided as part of the recovery mode signal sent through the recovery bus (cable 270 or in-motherboard 275) to the sideband interface of the component. In another embodiment, the updated firmware is sent through a mainband interface of the trusted device through the motherboard 205 of the hardware server to a main band interface of the component once the recovery mode signal has placed the component in the recovery mode. The previously installed firmware is replaced by the updated firmware, thereby updating the firmware of the component. In some embodiments, the firmware of the component is stored in a memory such as a PROM, EPROM, or EEPROM. In this embodiment, the previously installed firmware is overwritten by the updated firmware to effect the firmware update. Further embodiments of this step are discussed elsewhere in this document. Process block 430 completes and processing continues at process block 435.

At process block 435, an indication that the firmware update is complete is received. In one embodiment, the indication is as simple as the recovery device logic 115 transmitting the final data bit(s) of the signal that includes the firmware update. In other embodiments, the recovery device logic 115 receives and parses a message indicating that the firmware update has completed. Further embodiments of this step are discussed elsewhere in this document. Process block 435 completes and processing continues at process block 440.

At process block 440, the recovery mode is terminated. In one embodiment, the recovery device logic 115 generates and sends a signal to the sideband interface of the component that will end recovery mode that permits the component to accept a firmware update. Further embodiments of this step are discussed elsewhere in this document. Process block 440 completes and processing continues at process block 445.

At process block 445, the enable signal is terminated. In one embodiment, the recovery device logic 115 ends sending the enable signal, and a non-enable signal is sent through the enable header to the switch associated with the component. In one embodiment, step 440 may be unnecessary, and step 440 may be accomplished by terminating the enable signal. Further embodiments of this step are discussed elsewhere in this document. Process block 445 completes.

Optionally, process steps from process block 415 through 445 can be repeated for additional components.

Processing continues from process block 445 to end block 450, where process 400 terminates.

Selected Specific Embodiments

In one embodiment, a trusted device for causing a component of a computing device to accept a firmware update is presented. In one embodiment, the trusted device is a trusted recovery device such as trusted recovery device 100 or 100a-100d, the component is one of component devices 215x, 215y, 215z, 215a, 220, 225, and 240. The trusted device includes a management interface such as management interface 110 configured to receive a command that authorizes a firmware update to the component. The trusted device also includes a recovery device logic (such as recovery device logic 115) that is configured to generate, in response to the received command, a signal configured to cause the component to enter a recovery mode. The recovery mode configures the component to accept the firmware update. The trusted device further includes an interface (such as enable register 135 or recovery bus header 140/ contacts 145) of the device that is configured to pass the signal to the component to cause the component to enter the recovery mode and accept the firmware update. Placing the component in the recovery mode forces the component to accept and install the firmware update provided to the component.

In one embodiment, the trusted device also includes a recovery interface portion of the interface (such as recovery bus header 140/contacts 145) of the device and a recovery bus (such as recovery bus cable 270 or in-motherboard recovery bus 275) configured to be connected between the recovery interface and an interface of the component (such as a sideband recovery interface of a component device). In this configuration, passing a portion of the signal to the interface of the component causes the component to enter the recovery mode. In one embodiment the recovery interface is a side-band interface of the device, the interface of the component is a side-band interface of the device, and the recovery bus bypasses a motherboard of the computing device. In one embodiment, the recovery interface is a main-band interface of the device that is configured to be connected to a motherboard of the computing device (for example, at an expansion bus of the motherboard), the interface of the component is a main-band interface of the device that is configured to be connected to a motherboard of the computing device (for example, at the expansion bus), and the motherboard includes the recovery bus.

In one embodiment, the trusted device also includes an enable register portion of the interface of the device (such as enable register 135) of the device, and a switch configured to be connected between the recovery bus and an interface of the component. An enable line is connected between the enable register and the switch. In this configuration, a portion of the signal is configured to activate the switch to pass the signal to the interface of the component.

In one embodiment, the trusted device also includes either (i) a jumper interface portion of the interface (such as enable register 135) of the device or (ii) a jumper interface portion of the switch. A jumper pin enable line is connected between the jumper interface portion of either the interface or the switch and enable pins of the component. In one embodiment with this configuration, a portion of the signal is configured to simulate a setting of the enable pins that causes the component to enable the interface of the component. In another embodiment with this configuration, a portion of the signal is configured to simulate a setting of the enable pins that causes the component to enter the recovery mode.

In one embodiment, the management interface is an ethernet interface to a network segment (such as management network 210) associated with an infrastructure management system or network control plane (such as management server 325). In one embodiment, the network segment is segregated from other network segments (such as main network 305). In one embodiment, the trusted device also includes a main-band interface of the device. In this configuration, the device is configured to receive the firmware update through the ethernet interface and pass it through the main-band interface to cause the component to receive the firmware update. In one embodiment, the management interface is a serial interface to a serial concentrator associated with an infrastructure management system or network control plane. In one embodiment, the management interface is a universal serial bus interface to a USB hub associated with an infrastructure management system or network control plane.

In one embodiment, the logic is configured to identify the component from a set of one or more components of a computing device as a destination for the signal. In one embodiment, the logic is configured to identify an appropriate order in which to send the signal to the component from among a set of one or more other signals intended for the other components of the set of one or more components. In one embodiment, the logic receives the command among a set of commands delivered through the management interface in the appropriate order in which to send the signal to the component from among a set of one or more other signals intended for other components of the set of one or more components. In one embodiment, the logic is configured to enqueue the signal with a set of one or more other signals intended for the other components of the set of one or more components, and sequentially send each signal of the set of signals to an associated component of the set of one or more components.

In one embodiment, the trusted device also includes an enable interface portion of the interface of the device configured to be connected to a switch connected to the side-band interface of the component. In this configuration, sending a switch activation portion of the signal configured to activate the switch to allow the passage of signals to the switch enables communication with the sideband interface of the component. The trusted device also includes a recovery interface portion of the interface of the device configured to be connected through the switch to the interface of the component. In this configuration, sending a recovery mode portion of the signal to the interface of the component causes the component to enter the recovery mode. The logic is configured to (i) identify the component from a set of one or more components of a computing device as a destination for the signal, (ii) send the switch activation portion of the signal to the switch associated with the component among the set of one or more components, and (iii) allow the passage of the recovery mode portion of the signal through the switch to the component, and prevent the passage of the recovery mode signal to other components of the set of one or more components.

In one embodiment, a system for applying a firmware update to a set of one or more computing devices is presented. The system includes a trusted device installed in each computing device of the set, wherein the trusted device includes a device interface and a management interface. In one embodiment, the trusted device is a trusted recovery device 100 or 100*a*-100*d*. The system also includes a component of a first type (such as 310*a*-310*d*) installed in each computing device of the set, wherein the component includes a component interface that is connected to the device interface. The system further includes an infrastructure manager (such as management server 325) that is connected to the management interface of each trusted device installed in each computing device of the set. In this configuration, the trusted device is configured to generate and send a signal configured to cause the component to be configured to accept the firmware update in response to receiving a command from the infrastructure manager.

The command is configured to authorize the firmware update to the component. In one embodiment, command includes an instruction to place the component into the recovery mode. In one embodiment, the command includes an instruction to configure the component to accept a firmware update, for example including an instruction to toggle enable pins, send an enable signal to the switch, or reboot the component. In one embodiment, the command includes an instruction to apply the firmware update to the component. In one embodiment, the command includes a location in memory (such as memory of the hardware server, or memory 120 of the device). from which the firmware update for the component can be retrieved, either by the trusted device, or by another component of the computing device. In one embodiment, the command includes the firmware update for the component. The trusted device parses the command to identify any instructions or other data.

In one embodiment, a system for applying a firmware update to a set of one or more computing devices is presented. The system includes a trusted device installed in each computing device of the set. The trusted device includes a device recovery interface, an enable register interface, a management interface, and a recovery bus that is connected to the device recovery interface. The system also includes a component of a first type installed in each computing device of the set. The component includes a sideband component interface, and a switch connected between the sideband component interface and the recovery bus. The switch includes a set of activation pins connected by an enable line to the enable register interface. The system also includes an infrastructure manager that is connected to the management interface of each trusted device installed in each of the computing devices of the set.

In one embodiment, the system for applying a firmware update to a set of one or more computing devices is configured to perform several actions in response to receiving a command from the infrastructure manager. The system will generate and send an activation signal from the enable register interface through the enable lines to the activation pins of the switch to enable signals to pass from the recovery bus through the switch to the sideband component interface. The system will then generate and send a recovery signal from the sideband device interface through the recovery bus to the sideband component interface, where the recovery signal is configured to cause the component to enter a recovery mode. Then, the system will provide a firmware update to the component. The recovery mode operation of the component forces the component to accept and install the firmware update.

In one embodiment, the system also includes a jumper interface portion and a recovery interface portion of the device interface, jumper pins of the component; and an enable line connecting the jumper interface to the jumper pins. In this configuration, a portion of the signal provided by the jumper interface is configured to simulate a setting of the jumper pins. In one embodiment, the setting of the jumper pins causes the component to enable the component interface. In one embodiment, the setting of the jumper pins causes the component to enter the recovery mode.

In one embodiment, the trusted device associates in memory (such as memory 120) one or more of the pins of the jumper interface portion with a component. Thus, for example, when a command received from the infrastructure manager includes an instruction to place the component into the recovery mode, the trusted device may retrieve from memory the identity of the pins associated with the component, and toggle those pins in response to the instruction.

In one embodiment, the system also includes a second component of a second type (such as 315a-315d) installed with a second switch in each computing device of the set. In this configuration, sending the activation signal to the switch, but not to the second switch causes the recovery signal to be received by the component, and not received by the second component.

In one embodiment, the system also includes second activation pins of the second switch, and an enable line connecting the enable register interface to the second activation pins. In this configuration, a second activation signal provided by the enable register interface is sent to the activation pins of the second switch through a second enable line. Here, sequentially activating the activation pins of the switch, delivering a recovery signal, and de-activating the activation pins, followed by activating the second activation pins of the second switch, delivering a second recovery signal, and deactivating the second activation pins enables the component and the second component to enter the recovery mode in sequence.

In one embodiment, the trusted device is in a same power domain as the component. In one embodiment, each computing device of the set is in the same power domain.

In one embodiment, the trusted device is a card installed in the computing device. In another embodiment the trusted device is integrated with a motherboard of the computing device.

In one embodiment, the trusted device is configured to provide the firmware update to the component device through a main-band interface of the device that is connected to a motherboard of the computing device (such as at an expansion bus, for example a PCIe bus). In one embodiment, the trusted device is configured to provide the firmware update to the component through a motherboard of the computing device (for example, over the expansion bus).

In one embodiment, the trusted device is configured to provide the firmware update to the component through the device recovery interface.

In one embodiment, the trusted computing device additionally generates an attestation BLOB reporting the firmware status of the component; and transmits the attestation BLOB through the management interface to a management server.

In one embodiment, a method (such as method 400) for securely updating firmware is presented. The method includes receiving a command from an infrastructure manager by a trusted device (such as described with reference to process block 410). The command initiates a firmware update for a component of a computing device using the recovery mode of the component. The method also includes, in response to receiving the command, generating a signal configured to cause the component to enter a recovery mode in which the component is configured to accept the firmware update (such as described with reference to process block 415). When the component is placed in recovery mode, the firmware update is assured to occur, and is assured to put in place the firmware that is indicated by the command. The method also includes transmitting the signal from the trusted device to the component (such as described with reference to process blocks 420-425). The method also includes updating the firmware of the one or more computing device components with the firmware update (such as described with reference to process block 430).

In one embodiment, generating the signal further comprises generating a first portion of the signal configured to activate a switch connected to the component.

In one embodiment, activating the switch causes the component to enable a component interface configured to accept a second portion of the signal by allowing the second portion of the signal to pass through the switch to the component, wherein the second portion of the signal is configured to cause the component to enter the recovery mode. In one embodiment, the signal activating the switch is also provided to an enable pin of the component to simulate the setting of the jumper to cause the component to enter the recovery mode.

In one embodiment, the method further includes sending an activation signal to a switch connected to the component. The activation signal is configured to activate a switch to allow signals to pass through the switch to the component. The method also includes, while the activation signal is being sent to the switch, transmitting the recovery mode signal configured to cause the component to enter the recovery mode. The method also includes, while the component is in the recovery mode, providing the firmware update to the component. The method also includes receiving an indication that the firmware update has completed. The method also includes terminating the activation signal following the completion of the update.

In one embodiment, the method further includes sending an activate jumper signal to a jumper of the component. The activate jumper signal is configured to simulate a setting of a jumper of the component. The method also includes, while the activate jumper signal is being sent to the jumper, transmitting the recovery mode signal configured to cause the component to enter the recovery mode. The method also includes, while the component is in the recovery mode, providing the firmware update to the component. The method also includes receiving an indication that the firmware update has completed. The method also includes terminating the activate jumper signal following the completion of the update.

In one embodiment, the firmware update is received by the computing device from the infrastructure manager using the trusted device.

In one embodiment, the method further includes authenticating the firmware update before transmitting the firmware update to the component. In another embodiment, the method further includes authenticating a command received through the management interface before executing that command. The authentication may include at least parsing the firmware update or command to identify a key indicating the source of the firmware or command, and then evaluating the identified key against one or more keys retrieved from the memory of the trusted recovery device. If the identified key is valid, based on the evaluation, the authentication is successful and the firmware update may be applied or the command executed. If the identified key is not valid, based on the evaluation, the authentication is not successful, and the firmware update will not proceed or the command will not be executed.

In one embodiment, the method further includes sending the firmware update to the component through a main-band interface between the computing device and the component.

In one embodiment, the method further includes sending the firmware update to the component from the trusted device through a sideband interface of the component.

Non-Transitory Computer-Readable Medium Embodiments

In one embodiment, one or more of the components described herein are configured as program modules stored in a non-transitory computer readable medium. The program modules are configured with stored instructions that when executed by at least a processor cause the computing device to perform the corresponding function(s) as described herein. For example, the recovery device logic 115 of the trusted recovery device 100 may be partly or wholly a program module. This module may comprise instructions on a non-transitory computer readable medium, that when executed by at least a processor (and potentially using other components of the trusted recovery device 100, cause the trusted recovery device to perform one or more functions described herein. Non-transitory computer-readable media described herein are limited to statutory subject matter under 35 U.S.C § 101.

In one embodiment, the management network 210 and management server 325 are a computing/data processing system including an application or collection of distributed applications for enterprise organizations. The management network 210 and management server 325 may be configured to operate with or be implemented as a cloud-based networking system, a software as a service (SaaS) architecture, or other type of networked computing solution. In one embodiment the management server is a centralized server-side application that provides at least the functions disclosed herein and that is accessed by many trusted recovery devices 100 over management network 210.

Computing Device Embodiment

In one embodiment, the trusted recovery device is implemented as special purpose hardware. This may be desirable in order to keep the device simple and behaviorally verifiable. This allows for a very high level of assurance that the device is performing only the set of designed functions. In another embodiment, the trusted recovery device may be implemented using a specially configured computing device.

Figure 5:
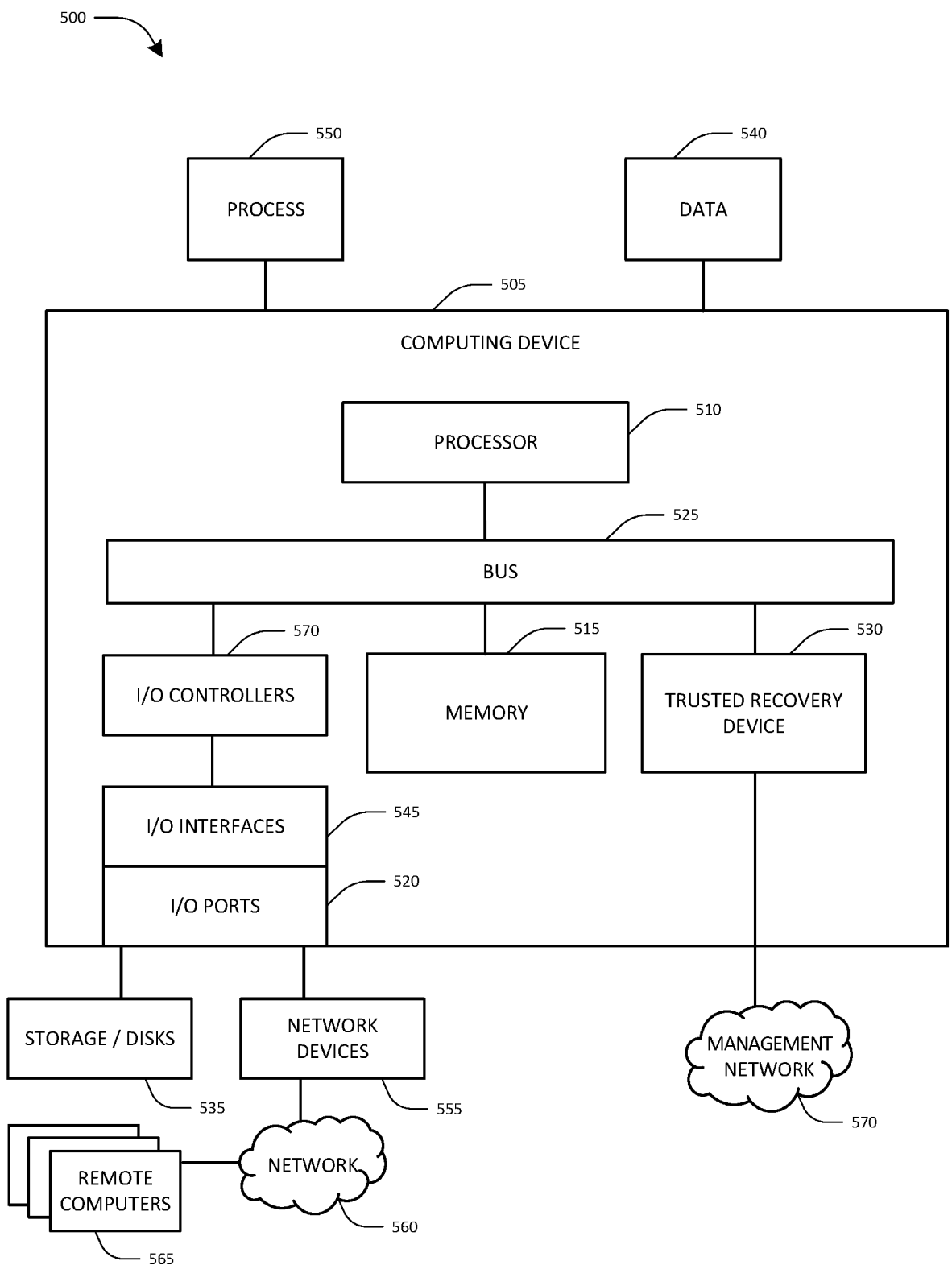
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 505 that includes a processor 510, a memory 515, and input/output ports 520 operably connected by a bus 525. In one example, the computer 505 may include trusted recovery device 530 configured similarly to those devices shown and described with reference to FIGS. 1, 2a, 2b, 2c, 3, and 4. In different examples, the trusted recovery device 530 may be implemented in hardware, a non-transitory computer-readable medium with stored instructions, firmware, and/or combinations thereof. While the trusted recovery device 530 is illustrated as a hardware component attached to the bus 525, it is to be appreciated that in other embodiments, the trusted recovery device 530 could be implemented in the processor 510, stored in memory 515, or stored in non-volatile storage device 535.

In one embodiment, trusted recovery device 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a personal computer, a smart phone, laptop, tablet computing device, and so on.

The means may be implemented, for example, as an ASIC programmed to perform the functions shown and described with reference to FIGS. 1, 2a, 2b, 2c, 3, and 4. The means may also be implemented as stored computer executable instructions that are presented to computer 505 as data 540 that are temporarily stored in memory 515 and then executed by processor 510.

Trusted recovery device 530 may also provide means (e.g., hardware, non-transitory computer-readable medium that stores executable instructions, firmware) for performing the functions shown and described with reference to FIGS. 1, 2a, 2b, 2c, 3, and 4.

Generally describing an example configuration of the computer 605, the processor 510 may be a variety of various processors including dual microprocessor and other multi-processor architectures. A memory 515 may include volatile memory and/or non-volatile memory. Non-volatile memory may include, for example, ROM, PROM, and so on. Volatile memory may include, for example, RAM, SRAM, DRAM, and so on.

A non-volatile storage device 535 may be operably connected to the computer 505 via, for example, an input/output (I/O) interface (e.g., card, device) 545 and an input/output port 520. The non-volatile storage device 635 may be, for example, a magnetic disk drive, a solid state drive, a floppy disk drive, a tape drive, a Zip drive, a flash memory card, a memory stick, and so on. Furthermore, the non-volatile storage device 535 may be an optical disk drive such as CD-ROM drive, a CD-R drive, a CD-RW drive, a DVD ROM drive, a BLU-RAY drive, and so on. The memory 515 can store a process 550 and/or a data 540, for example. The non-volatile storage device 535 and/or the memory 515 can store an operating system that controls and allocates resources of the computer 505.

The computer 505 may interact with input/output (I/O) devices via the I/O interfaces 545 and the input/output ports 520. Input/output devices may be, for example, a keyboard, a microphone, a pointing and selection device, cameras, video cards, displays, the non-volatile storage device 535, the network devices 555, and so on. The input/output ports 520 may include, for example, serial ports, parallel ports, and USB ports.

The computer 505 can operate in a network environment and thus may be connected to the network devices 555 via the I/O interfaces 545, and/or the I/O ports 520. Through the network devices 555, the computer 505 may interact with a network 560. Through the network 560, the computer 505 may be logically connected to remote computers 565. Networks with which the computer 505 may interact include, but are not limited to, a LAN, a WAN, and other networks. The computer 505 may manage data communications to and from the I/O interfaces with I/O controllers 570.

The computer 505 may exchange electronic messages with the remote computers 565 over the network 560. Such electronic messages may be provided as emails, short message service (SMS) messages or other types of message using Transmission Control Protocol (TCP)/Internet Protocol (IP) or other communication protocols.

Additionally, the trusted recovery device 530 may have a dedicated network connection to a management network 575. In some cases, the management network 575 is segregated from network 560, either logically, physically, or both.

Definitions and Other Embodiments

In another embodiment, the described methods and/or their equivalents may be implemented with computer executable instructions that govern controller input/output terminals. Thus, in one embodiment, a non-transitory computer readable/storage medium is configured with stored computer executable instructions of an algorithm/executable application that when executed by a machine(s) cause the machine(s) (and/or associated components) to perform the method using controller input/output terminals that may serve as the enable register and device recovery interface. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. No function or action described herein can be performed by the human mind. Any such interpretation is inconsistent with this specification.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Non-volatile", as used herein, excludes transitory, propagating signals.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection. Generally, references to connections between components herein may be understood to be operable connections.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A trusted device for causing a component of a hardware server to accept a firmware update, comprising:
   a management interface configured to receive a command that authorizes a firmware update to the component;
   a recovery device logic that is configured to generate, in response to the command, a signal configured to cause the component to enter a recovery mode;
   a recovery interface of the trusted device that is configured to transmit the firmware update to a sideband interface of the component, wherein the sideband interface of the component is a debug port of the component; and
   an enable register of the trusted device that is configured to pass the signal to the component to cause the component to enter the recovery mode, wherein the recovery mode forces the component to accept communication through the sideband interface and install the firmware update to the component provided to the component through the sideband interface, wherein the firmware update to the component is installed by the component executing one or more of a permanent set of functions immutably recorded in the component.

2. The trusted device of claim 1, further comprising:
   a recovery bus configured to be connected between the recovery interface and the sideband interface of the component;
   wherein passing an input through the sideband interface of the component causes the component to enter the recovery mode.

3. The trusted device of claim 2, further comprising:
   a switch configured to be connected between the recovery bus and the sideband interface of the component; and
   an enable line configured to be connected between the enable register and the switch,
   wherein the signal is configured to activate the switch to pass the commands or data to the component through the sideband interface of the component.

4. The trusted device of claim 1, wherein the management interface is an ethernet interface to a network segment that is (i) segregated from other network segments and (ii) associated with an infrastructure management system.

5. The trusted device of claim 1, wherein the recovery device logic is configured to identify the component from a set of one or more components of the hardware server as a destination for the signal.

6. The trusted device of claim 5, wherein the recovery device logic receives the command among a set of commands delivered through the management interface in the appropriate order in which to send the signal to the component from among a set of one or more other signals intended for other components of the set of one or more components.

7. The trusted device of claim 1, wherein the recovery mode is a failsafe operating mode of the component that allows direct configuration of the component through the sideband interface using the permanent set of functions immutably recorded in the component device.

8. The trusted device of claim 1, wherein the trusted device is configured to be installed in a computing system.

9. A system for applying a firmware update to a set of one or more hardware servers, comprising:
- a trusted device installed in each hardware server of the set, wherein the trusted device includes a device recovery interface, an enable register interface, a management interface, and a recovery bus that is connected to the device recovery interface;
- a component of a first type installed in each hardware server of the set, wherein the component includes a debug port, and a switch connected between the debug port and the recovery bus, wherein the switch includes a set of activation pins connected by an enable line to the enable register interface; and
- an infrastructure manager that is connected to the management interface of each trusted device installed in each of the hardware servers of the set;
- wherein the trusted device is configured to, in response to receiving a command from the infrastructure manager,
  (i) generate and send an activation signal through the enable register interface through the enable lines to the activation pins of the switch to enable signals to pass from the recovery bus through the switch to the debug port,
  (ii) generate and send a recovery signal from the device recovery interface through the recovery bus to the debug port, wherein the recovery signal is configured to cause the component to enter a recovery mode in which the component processes commands received through the debug port with a permanent set of functions immutably recorded in the component, and
  (iii) provide a firmware update to the component, wherein the recovery mode forces the component to accept and install the firmware update to the component, wherein the firmware update to the component is installed by the component executing one or more of the permanent set of functions immutably recorded in the component.

10. The system of claim 9, further comprising:
a second component of a second type installed with a second switch in each hardware server of the set, wherein sending the activation signal to the switch, but not to the second switch causes the recovery signal to be received by the component, and not received by the second component.

11. The system of claim 9, wherein the trusted device is in a same power domain as the component.

12. The system of claim 9, wherein the trusted device is a card installed in the hardware server or the trusted device is integrated with a motherboard of the hardware server.

13. The system of claim 9, wherein the component executes in the recovery mode to install the firmware update while one or more other components installed in the hardware server operate in a mode other than the recovery mode.

14. The system of claim 9, wherein the trusted device is configured to provide the firmware update to the component device through a main-band interface of the device that is connected to a motherboard of the hardware server.

15. The system of claim 9, wherein the trusted device is configured to provide the firmware update to the component through the device recovery interface.

16. The system of claim 9, wherein the trusted device:
- receives a request for an attestation binary large object through the management interface;
- generates the attestation binary large object including a report of the firmware status of the component, wherein the reported firmware status is signed with a key of the trusted device; and
- transmits the attestation binary large object through the management interface to a management server, wherein the attestation binary large object enables the management server to verify that the report comes from the trusted device.

17. A method for securely updating firmware, comprising:
- receiving a command by a trusted device, wherein the command authorizes a firmware update for a component of a hardware server;
- in response to receiving the command, generating a recovery mode signal configured to cause the component to enter a recovery mode in which the component processes commands received through a debug port of the component with a permanent set of functions for direct configuration of the component;
- transmitting the recovery mode signal from the trusted device to the debug port of the component causing the component to enter the recovery mode; and
- updating the firmware of the component while in the recovery mode by installing the firmware update by executing the commands received through the debug port with one or more of the permanent set of functions immutably recorded in the component.

18. The method of claim 17, further comprising:
- sending an activation signal to a switch connected to the component, wherein the activation signal is configured to activate a switch to allow signals to pass through the switch to the component;
- while the activation signal is being sent to the switch, transmitting the recovery mode signal configured to cause the component to enter the recovery mode;
- while the component is in the recovery mode, transmitting the firmware update to the component;
- receiving an indication that the firmware update has completed; and
- terminating the activation signal following the completion of the update.

19. The method of claim 18, further comprising authenticating the firmware update before transmitting the firmware update to the component.

20. The method of claim 18, further comprising transmitting the firmware update to the component from the trusted device through the debug port of the component.

* * * * *